United States Patent [19]

Price

[11] 3,938,234

[45] Feb. 17, 1976

[54] PIPE JOINING METHOD

[76] Inventor: George Price, 14444 Wicks Blvd., San Leandro, Calif. 94577

[22] Filed: July 15, 1974

[21] Appl. No.: 488,796

[52] U.S. Cl. .................. 29/237; 254/77; 254/127; 29/267; 156/295
[51] Int. Cl.² ............................ B23P 19/04
[58] Field of Search ...... 29/237, 267 X; 254/127 X, 254/83, 77 X; 156/295 X, 294

[56] References Cited
UNITED STATES PATENTS

| 409,008 | 8/1889 | Breymann | 29/237 |
|---|---|---|---|
| 1,317,145 | 9/1919 | Skantz | 254/77 X |
| 3,665,579 | 5/1972 | Jaeger | 29/237 |
| 3,787,951 | 1/1974 | Morphis | 29/237 |

Primary Examiner—Charlie T. Moon
Attorney, Agent, or Firm—Harris Zimmerman

[57] ABSTRACT

An apparatus for joining the free end of a first pipe to a coupling collar secured to the end of a second pipe includes a longitudinally extending member adapted to engage the coupling collar while supported by the second pipe, and a flexibly extending member secured to the lateral member. With the pipe ends adjacent, the flexibly extending member is wrapped spirally about the first pipe and secured thereto. A lever member adapted to engage the flexibly extending member is then placed on the longitudinally extending member, and operated to tension and pull the flexibly extending member, which draws the end of the first pipe into the coupling while also rotating the first pipe.

4 Claims, 6 Drawing Figures

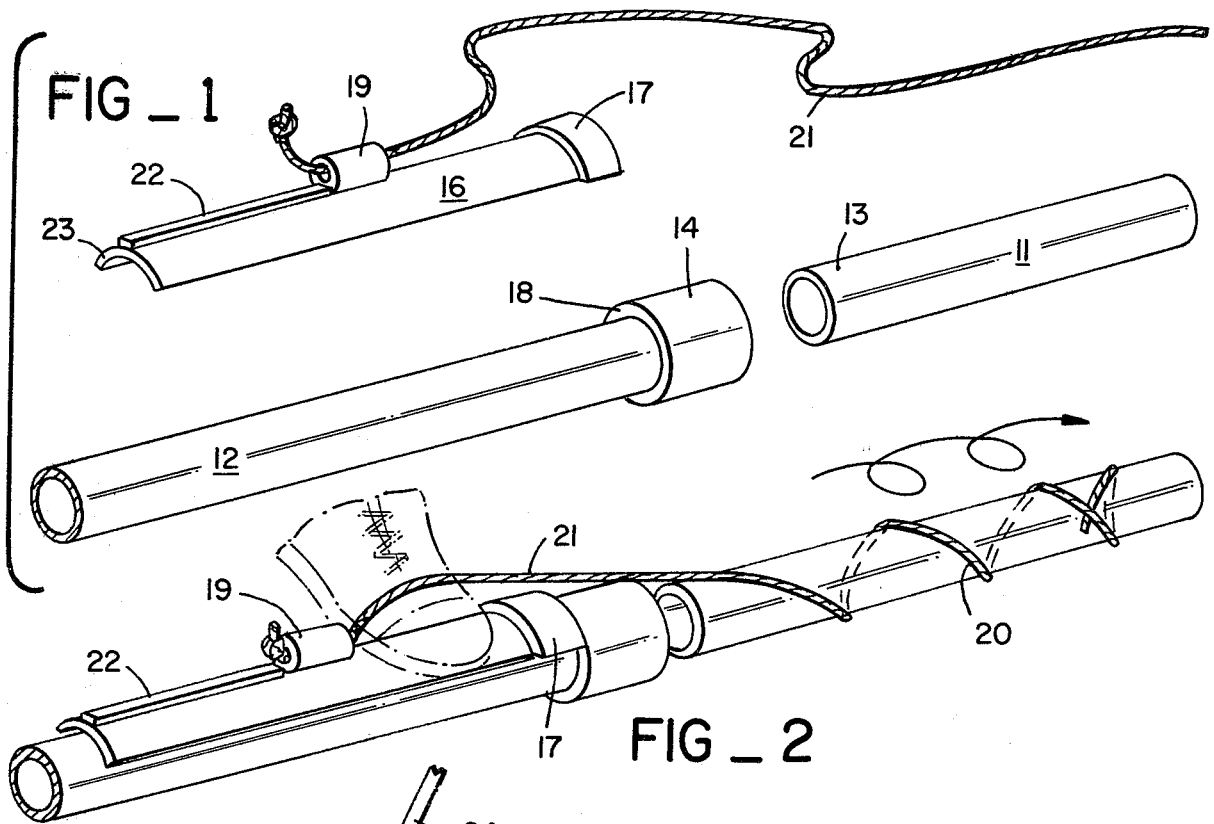
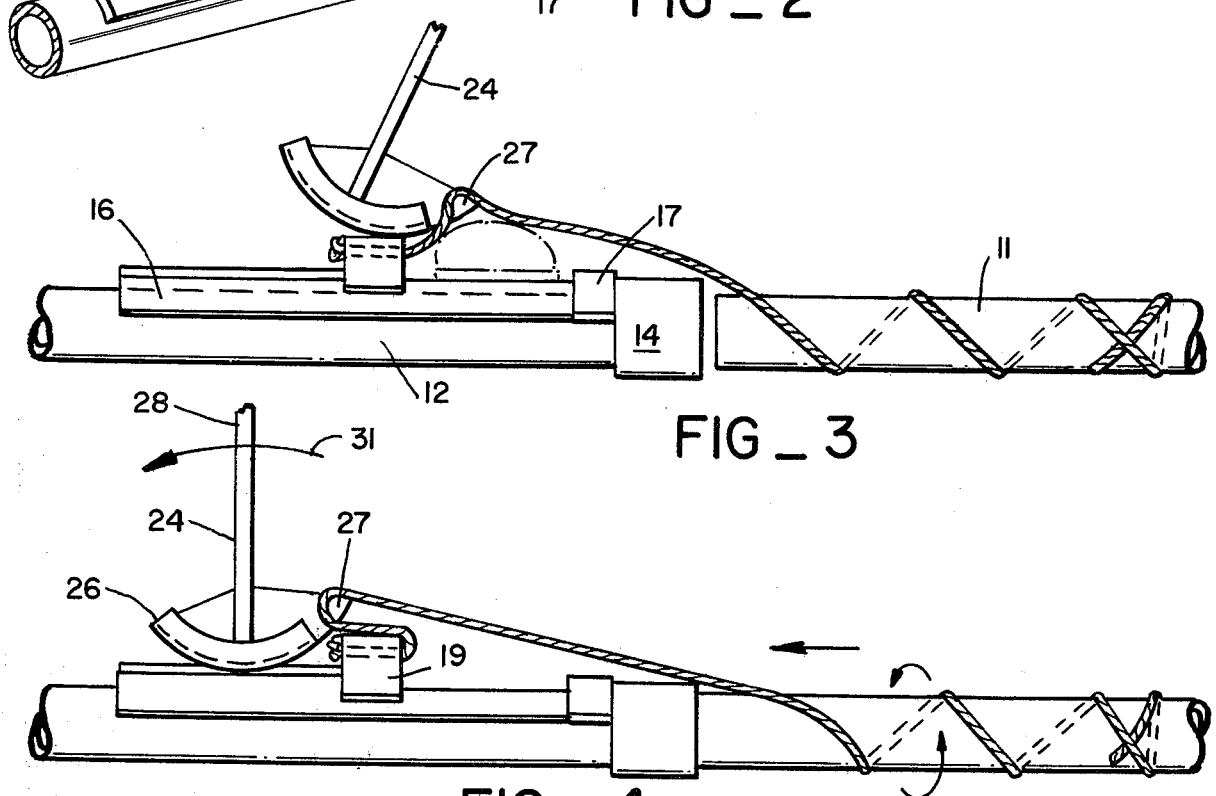
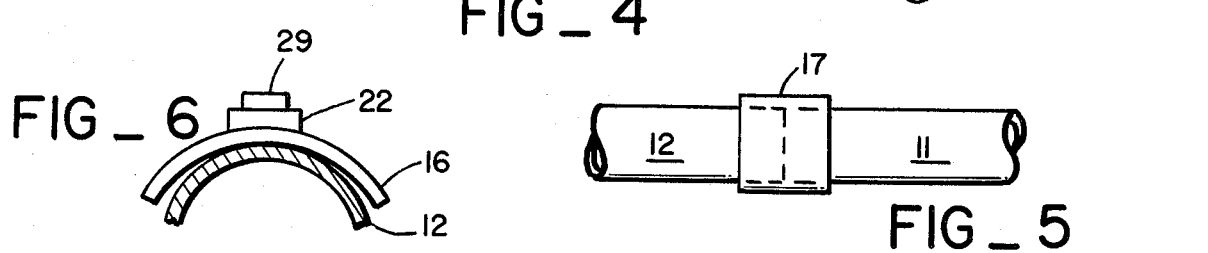

PIPE JOINING METHOD

BACKGROUND OF THE INVENTION

It is common practice in the construction industry to employ plastic or PVC pipe for use in plumbing and electrical distribution. The pipe is provided in long-length sections, one end of each section provided with a coupling collar dimensioned to receive the free end of a similar section. Typically, sections of pipe are joined by first placing a free end of one section adjacent to a coupling end of another, and then coating the free end with epoxy adhesive, PVC resin, or the like. The two sections are joined by inserting the free end into the coupling end while rotating the section with the free end to spread the adhesive uniformly within the joint thus formed. This procedure insures that a leakproof, permanent seal will be created by the adhesive.

A problem often encountered when employing this procedure with sections of pipe that are long and unwieldy, or that have been previously filled with electrical conductors or the like, is that the pipes can be joined translationally, but rotation of one to effect a good adhesive seal is quite difficult. Thus several persons may be required to join plastic pipe sections correctly. Lacking sufficient personnel or specialized tools to rotate the pipe during fitting, the attempt to form a good pipe joint may be abandoned to expediency.

SUMMARY OF THE INVENTION

The present invention is generally directed toward an apparatus and method for joining pipe sections correctly with an ease and efficiency heretofore unknown. It includes a lateral member adapted to translationally engage the coupling collar while supported on the pipe section bearing the coupling collar, and a flexibly extending member secured to the lateral member. The lateral member includes a track for engaging and supporting a lever member which is adapted to engage the flexibly extending member and tension and pull the latter.

The apparatus is employed by first abutting the free end and coupling end to be joined, applying the adhesive, and placing the lateral member on the pipe section having the coupling collar and in engagement therewith. The flexibly extending member is then wrapped about the other pipe section and secured with a slip knot or other suitable means. The flexibly extending member is engaged by the lever member and tensioned therewith, drawing the free end into the coupling collar while also causing rotation of the section having the free end. Thus the two pipe sections may be joined in the correct manner with ease and speed.

THE DRAWING

FIG. 1 is a perspective view of a portion of the present invention.

FIG. 2 is a perspective view of the present invention in use.

FIG. 3 is a vertical elevation of the present invention, showing the engagement of the lever member and the flexibly extending member.

FIG. 4 is a vertical elevation similar to FIG. 3, showing the action of the lever member and the results thereof.

FIG. 5 is a detailed view of two pipe sections joined by the present invention.

FIG. 6 is a fragmentary vertical cross-section of the lateral member disposed on a pipe section.

DESCRIPTION OF THE PREFERRED EMBODIMENT

With reference to the accompanying Figures, the present invention is designed to join together pipe sections such as sections 11 and 12. section 11 has a free end 13 which is received in a coupling collar 14 secured to or formed integrally with section 12. These pipe sections are best joined by applying suitable adhesive, resin or other sealing compound to the free end 13, and inserting the end 13 into the coupling collar 14 while rotating the section 11. The rotation is important in that it causes the sealing compound to flow evenly in the pipe joint and form a leak-proof seal. The present invention joins the pipe sections translationally while imparting the desired rotation to section 11. Although these procedures are commonly used in fitting plastic or PVC pipe, the invention is not limited to such use.

The invention includes a member 16 which is positioned axially or longitudinally along pipe section 12, and which is provided with a concave curvature which adapts it to be supported by a pipe section. The amount of curvature is not critical, and may be presumed to be shallow enough to accommodate pipes of differing diameter. The member is provided with a flanged end 17 which is adapted to abut the edge 18 of the collar 14.

Centrally disposed on the member 16 and joined thereto is an eye 19 to which a flexibly extending member 21 is secured. The member 21 may comprise a length of rope, as shown in the Figures, or a strap or tape of sufficient tensile strength. A track 22 extends from the eye 19 to the end 23 of the member, comprising a rectangular bar adapted to receive a lever member 24. The lever member may constitute a pipe bender, a tool well-known in the art. Such a pipe bender generally comprises an arcuate channel member 26 which engages the track 22 and which includes a hook 27 at one end thereof, and a handle member 28 secured medially thereto. The track may include a second, smaller, longitudinally extending bar 29 secured atop track 22, producing a compound track, as shown in FIG. 6, which will accommodate pipe benders of varying channel size.

To employ the present invention to best advantage, the following steps are taken. First, the pipe sections 11 and 12 are brought together with the ends 13 and 14 adjacent and the sections aligned. The free end 13 is then coated with an appropriate sealing compound, such as epoxy resin. The member 16 is then placed on the pipe section 12, with the flanged end 17 abutting the edge 18. The flexibly extending member 21 is wrapped spirally about section 11 as shown in FIG. 2 at 20, and secured with a slip knot such as a half-hitch.

With the member 16 held in place by the foot of the worker, the lever member 24 is placed on the track 22, and the flexibly extending member 21 is secured through the hook 27. The lever member is then manually moved as shown by the arrow 31 in FIG. 4, tensioning and pulling the extending member 21. The force thus exerted between the section 11 and the coupling collar 17 draws the section 11 into the coupling collar. The sprial wrap of the extending member 21 at the same time imparts a rotational motion to the pipe section 11, providing the desired rotation during fitting which spreads the adhesive uniformly in the coupling to form a good seal. The joined pipes are depicted in FIG. 5.

To facilitate use of the apparatus, the free end of the flexibly extending member may be provided with a self-fastener to obviate the need for a slip knot. Such self-fasteners may comprise a strip of hook and pile material, or snaps, but are not limited to such material. Furthermore, the member 16 may be provided with a strap adapted to be wrapped about the pipe section 12 and fastened to itself to releasably secure the member 16 to the pipe section.

I claim:

1. An apparatus for rotating a first pipe section while translating the first pipe section into the coupling end of a second pipe section, comprising:
    a first member adapted to be supported on the second pipe section and extending longitudinally along the same,
    a second member extending flexibly from said first member and releasably secured in convoluted form to said first pipe section, and
    lever means for tensioning and pulling said second member toward said first member, said first member including a longitudinally extending track for supporting and guiding said lever means, said lever means including an element for releasably engaging an end portion of said second member whereby movement of said lever effects rotation of said first pipe section and axial movement thereof towards and into said coupling end of said second pipe section.

2. The apparatus of claim 1, wherein said first member includes a flange at one end thereof for engaging the coupling end of the second pipe section.

3. The apparatus of claim 1 wherein said first member includes an eye extending therefrom, and said second member comprises a length of rope secured to said eye.

4. The apparatus of claim 1, wherein said first member has an arcuate concave cross-sectional configuration for engaging the pipe section.

* * * * *